United States Patent [19]

Hirata et al.

[11] Patent Number: 5,005,358
[45] Date of Patent: Apr. 9, 1991

[54] HYDRAULIC DRIVE SYSTEM FOR CRAWLER-MOUNTED CONSTRUCTION VEHICLE

[75] Inventors: Toichi Hirata, Ushiku; Hideaki Tanaka, Tsuchiura; Genroku Sugiyama, Inashiki; Yusuke Kajita, Tsuchiura, all of Japan

[73] Assignee: Hitachi Construction Machinery Co., Ltd., Tokyo, Japan

[21] Appl. No.: 349,851

[22] Filed: May 10, 1989

[30] Foreign Application Priority Data

May 12, 1988 [JP] Japan ................. 63-113435

[51] Int. Cl.⁵ ............................................ F16D 31/02
[52] U.S. Cl. ......................................... 60/426; 60/484
[58] Field of Search ................. 180/308, 6.48; 60/426, 60/452, 484

[56] References Cited

U.S. PATENT DOCUMENTS

| | | | |
|---|---|---|---|
| 4,425,759 | 1/1984 | Krusche | 60/420 |
| 4,531,601 | 7/1985 | Barbagli | 60/426 X |
| 4,535,809 | 8/1985 | Andersson | 137/596.14 |
| 4,570,441 | 2/1986 | Yosida et al. | 180/6.48 X |
| 4,617,854 | 10/1986 | Kropp | 91/517 |
| 4,769,991 | 9/1988 | Johnson | 60/426 |

FOREIGN PATENT DOCUMENTS

3422165 12/1984 Fed. Rep. of Germany .

Primary Examiner—William E. Wayner
Attorney, Agent, or Firm—Fay, Sharpe, Beall, Fagan, Minnich & McKee

[57] ABSTRACT

A hydraulic drive system for a crawler-mounted construction vehicle includes: a hydraulic pump (1); a plurality of hydraulic actuators including traveling hydraulic motors (2, 3) driven by the hydraulic pump; a plurality of flow control valve means including first and second flow control valve means (15, 16; 35, 36) for respectively controlling the flow rates of the hydraulic fluid supplied from the pump to motors; pump controlling means (11) for effecting control during the driving of the motors in such a manner that the discharge pressure of the pump becomes higher by a fixed value than the higher one of load pressures of the motors; and first and second pressure balance valve means (17, 18; 37, 38) for respectively controlling the rates of flow through the flow control valve means during the driving of the motors in such a manner that the load pressures of the motors do not affect the rates of flow through the first and second flow control valve means. The first and second pressure balance valve means (17, 18; 37, 38) are respectively provided with valve control means (62, 63; 66, 67) which do not cause the associated pressure balance valve means to be actuated until the differential pressure between the load pressure generated in a first motor (2) and the load pressure generated in a second motor (3) reaches a predetermined value ($\Delta P_0$), and causes the pressure balance valve means to be actuated when the differential pressure exceeds the predetermined value.

5 Claims, 5 Drawing Sheets

HYDRAULIC DRIVE SYSTEM FOR CRAWLER-MOUNTED CONSTRUCTION VEHICLE

BACKGROUND OF THE INVENTION

The present invention relates to a hydraulic drive system for a crawler-mounted construction vehicle such as a hydraulic excavator. More particularly, the present invention concerns a hydraulic drive system having pressure balance valves for effecting load-compensating control of the flow rates of hydraulic fluid supplied to a pair of traveling motors that are respectively adapted to drive the left and right crawler belts, i.e., traveling means for the crawler-mounted construction vehicle.

As disclosed in U.S. Pat. No. 4,425,759, a known hydraulic drive system for a crawler-mounted construction vehicle comprises a hydraulic pump, left and right traveling hydraulic motors driven by a hydraulic fluid discharged by the hydraulic pump, flow control valves for respectively controlling the flow rates of the hydraulic fluid from the hydraulic pump to the traveling motors, a pump regulator for effecting control during the driving of the left and right traveling motors in such a manner that the discharge pressure of the hydraulic pump becomes higher by a fixed value than the higher one of load pressures of the left and right traveling motors, and pressure balance valves for respectively controlling the rates of flow through the flow control valves during the driving of the left and right traveling motors in such a manner that the load pressure of the traveling motors does not affect the rates of flow through the flow control valves. Control of the rates of flow through the flow control valves effected by these pressure balance valves is referred to herein as load-compensating control.

In the hydraulic drive system disclosed U.S. Pat. No., 4,425,759, the arrangement is such that the pressure balance valves are disposed downstream of the associated flow control valves, and the pressure downstream of the flow control valves acts in the valve opening direction, while the higher one of load pressures of the left and right traveling motors acts in the valve closing direction.

Thus, by providing the pressure balance valves for effecting the load-compensating control of the rates of flow through the flow control valves for the left and right traveling motors, even if there is any differential between the load pressures of the left and right traveling motors during traveling, it is possible to effect distribution of fluid flow corresponding to the ratio of the valve openings (demand flow rates) of the flow control valves for left and right traveling motors. In case of steering the crawler belts to change the advancing direction of the vehicle, the hydraulic fluid is supplied positively to the higher load side traveling motor associated with the outwardly turning crawler belt, making it possible to effect an intended change in the course. In addition, when the vehicle is made to travel straight, even if the resistance to which the left and right crawler belts are subjected differs, control is effected in such a manner that the rates flow through the flow control valves become equivalent, thereby effecting straight traveling.

With this conventional system, however, since the straight traveling is effected by conducting the load-compensating control of the rates of flow through the flow control valves by means of the pressure balance valves, variations in the performance of hydraulic devices such as the flow control valves, the pressure balance valves, etc., that are ascribable to fabrication errors affect the straight traveling characteristics. For this reason, it has been necessary for the operator to adjust the advancing direction while viewing the actual traveling direction. In addition, in cases where the strokes of control levers change slightly and the openings of the flow control valves is thereby changed, the rates of flow through the flow control valves also change, thereby hampering the straight traveling characteristics. Consequently, it has been necessary for the operator to pay utmost attention to ensure that the strokes of the control levers do no change by the slightest degree. Thus, with the conventional system, there has been the problem that substantial labor is required of the operator in effecting the straight traveling of the vehicle, increasing the operator's fatigue.

In addition, U.S. Pat. No. 4,535,809 discloses a system which is not directly related to a hydraulic drive system for a crawler-mounted construction vehicle, but in which a flow control valve is arranged by a seat valve assembly which comprises a seat-type main valve, a pilot circuit associated with the main valve, a pilot valve disposed in this pilot circuit and adapted to control the operation of the main valve, and a pressure balance valve disposed in the pilot circuit and adapted to effect the load-compensating control of the rate of flow through the pilot valve.

In addition, DE-A3422165 discloses a pressure balance valve which is disposed upstream of a flow control valve and which causes the discharge pressure of a hydraulic pump and the outlet pressure of the flow control valve to act in the valve opening direction and causes the maximum one of load pressures of a plurality of actuators and the inlet pressure of the flow control valve to act in the valve closing direction.

SUMMARY OF THE INVENTION

Accordingly, an object of the present invention is to provide a hydraulic drive system for a crawler-mounted construction vehicle which is capable of positively effecting a change in the advancing direction of the vehicle and of readily effecting straight traveling.

To this end, according to the present invention, there is provided a hydraulic drive system for a crawler-mounted construction vehicle comprising: a hydraulic pump; a plurality of hydraulic actuators including first and second traveling hydraulic motors driven by a hydraulic fluid discharged by the hydraulic pump; a plurality of flow control valve means including first and second flow control valve means for respectively controlling the flow rates of the hydraulic fluid supplied from the hydraulic pump to the first and second traveling hydraulic motors; pump controlling means for effecting control during the driving of the first and second traveling motors in such a manner that the discharge pressure of the hydraulic pump becomes higher by a fixed value than the higher one of load pressures of the traveling motors; and first and second pressure balance valve means for respectively controlling the rates of flow through the flow control valve means during the driving of the first and second traveling motors in such a manner that the load pressures of the traveling motors do not affect the rates of flow through the first and second flow control valve means, wherein the first and second pressure balance valve means are respectively provided with valve control means which do not cause the associated pressure balance valve means to be actuated until the differential pressure between the load pressure of the first traveling motor and the load pressure of the second traveling motor reaches a predetermined value, and causes the pressure balance valve means to be actuated when the differential pressure exceeds the predetermined value.

The valve controlling means preferably comprise springs for urging the associated pressure balance valve means in the opening direction.

In the hydraulic drive system thus arranged in accordance with the present invention, when a vehicle is made to travel straight, even if the resistance to which the left and right crawler belts are subjected differs and a differential arises between the load pressures of the first and second traveling motors, the pressure balance valves are not actuated insofar as that differential pressure is not more than the aforementioned predetermined value, with the result that the first and second traveling motors are set in the same condition as that in which the motors are connected in parallel. Consequently, in the same way as a general hydraulic circuit in which the left and right traveling motors are connected in parallel, the flow rates of the hydraulic fluid supplied to the first and second traveling motors are forcedly made to be equivalent by the forces possessed by the crawler belts themselves to maintain the straight traveling, thereby effecting straight traveling. In addition, since the straight traveling is effected forcedly by the straight traveling-maintaining forces of the crawler belts themselves with the pressure balance valve thus set in the nonoperative state, the straight traveling is not affected by the variations in the performance of hydraulic devices such as the flow control valves and pressure balance valves due to fabrication errors and the slightest changes in the strokes of the control levers. Hence, it is possible to substantially alleviate the burden imposed on the operator.

Furthermore, when changing the advancing direction of the vehicle, if one control lever is operated by a greater degree and the flow rate of the hydraulic fluid supplied to the traveling motor associated with the outwardly turning-side crawler belt is thereby increased, the differential pressure between the load pressures of the first and second traveling motors becomes the predetermined value or above, so that the pressure balance valve means associated with the lower load pressure side traveling motor is actuated. As a result, in the same way as the conventional system, it is possible to effect the load-compensating control of the rates of flow through the flow control valves, thereby allowing the vehicle to turn, as desired.

With respect to the forms of implementation of the first and second pressure balance valve means, a number of examples can be cited. For instance, as the first and second pressure balance valve means, it is possible to adopt pressure balance valves that are disposed downstream of the associated flow control valve means, the pressure balance valves having the pressure downstream of the flow control valve means acting in the valve opening direction, and the higher one of load pressures of the first and second traveling motors acting in the valve closing direction, and wherein the valve control means comprise springs for urging the associated pressure balance valves in the valve opening direction.

In addition, it is possible to adopt the first and second flow control valve means which include seat valve assemblies each having a seat-type main valve, a pilot circuit provided for the main valve, and a pilot valve disposed in the pilot circuit and adapted to control the operation of the main valve, the first and second pressure balance valve means which respectively comprise pressure balance valves each disposed in the pilot circuit of the seat valve assembly of the associated flow control valve means, the pressure balance valves each being actuated in the valve opening direction in response to the pressure differential between the discharge pressure of the hydraulic pump and the higher pressure side load pressure of the first and second traveling motors and being actuated in the valve closing direction in response to the differential pressure across the pilot valve, and the valve controlling means which comprise springs for urging the associated pressure balance valves in the valve opening direction.

Furthermore, it is possible to adopt the first and second pressure balance valve means which respectively comprise pressure balance valves disposed upstream of the associated flow control valve means, the pressure balance valves each having the differential pressure between the discharge pressure of the hydraulic pump and the higher one of load pressures of the first and second traveling motors acting in the valve opening direction and the differential pressure across the associated flow control valve means acting in the valve closing direction, and the valve controlling means which comprise springs for urging the associated pressure balance valves in the valve opening direction.

DESCRIPTION OF THE PREFERRED EMBODIMENTS

DESCRIPTION OF THE PREFERRED EMBODIMENTS

First Embodiment

Figure 1:
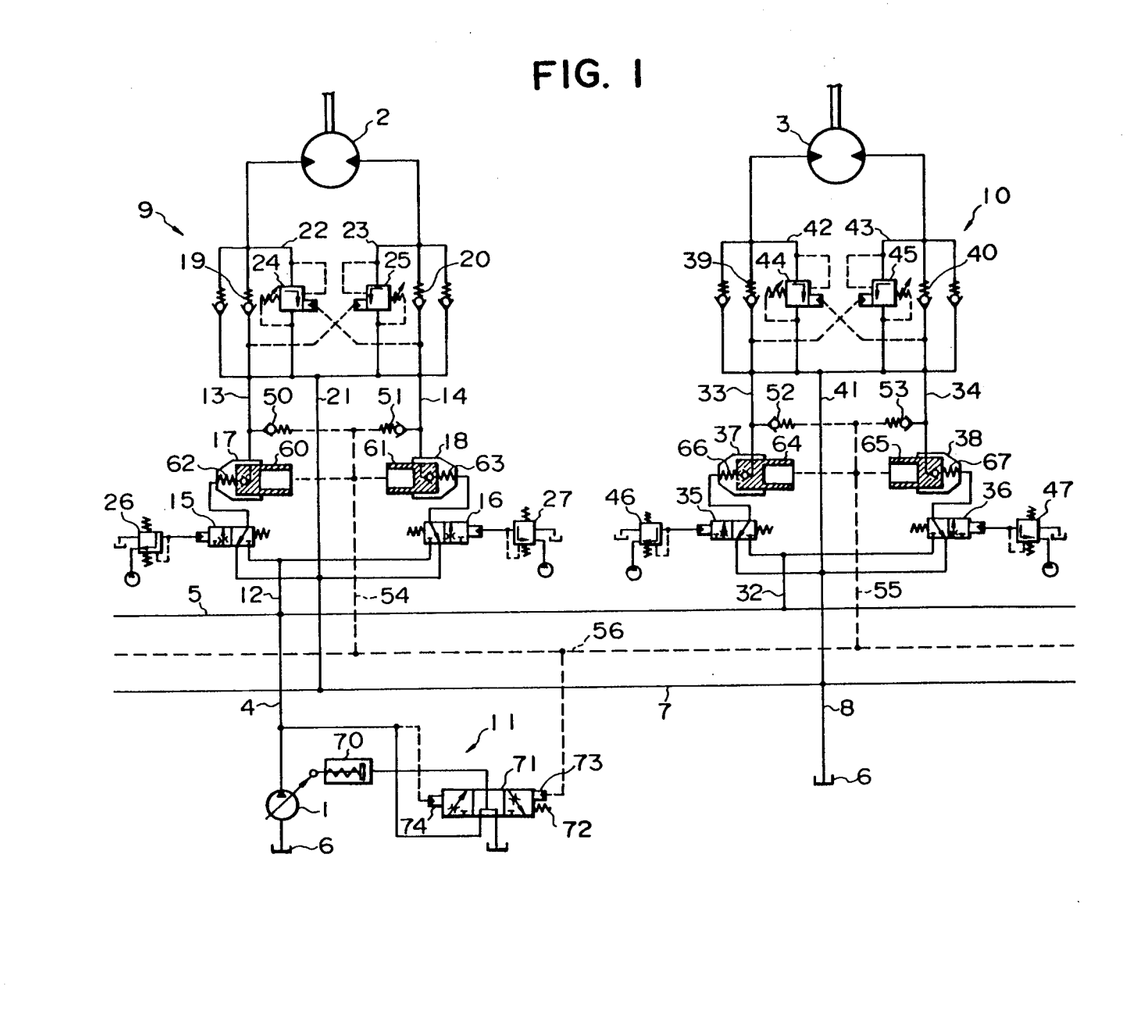
FIG. 1 is a hydraulic circuit diagram of a hydraulic drive system in accordance with an embodiment of the present invention.
Figure 2:
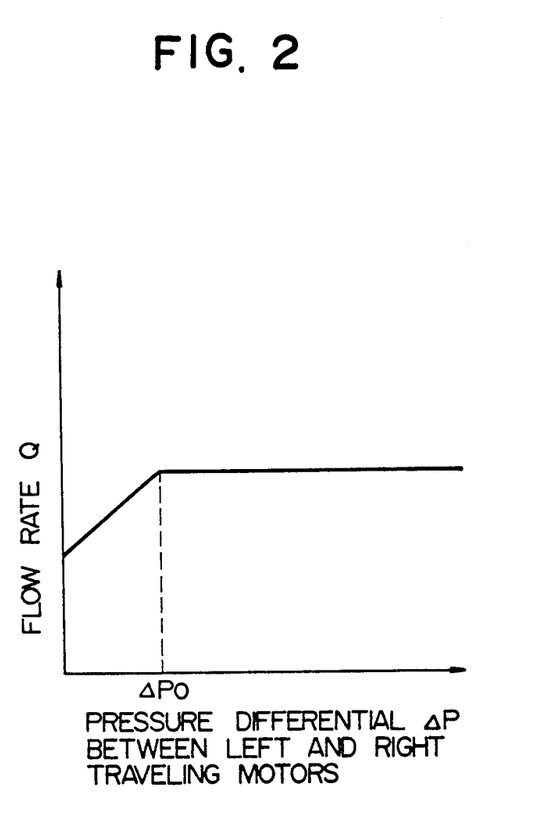
FIG. 2 is a diagram illustrating the characteristics of a pressure balance valve.

Referring now to FIGS. 1 and 2, a description will be given of an embodiment of the present invention.

In FIG. 1, a hydraulic drive system for a crawler-mounted construction vehicle in accordance with the present invention comprises the following components: a variable displacement hydraulic pump 1 of, for instance, a swash plate type; a plurality of hydraulic actuators that are driven by the hydraulic fluid from this hydraulic pump 1, and which include hydraulic motors respectively adapted to drive the eft and right crawler belts provided in the crawler-mounted construction vehicle, i.e., a left traveling motor 2 and a right traveling motor 3; common fluid supply lines 4, 5 connected to the hydraulic pump 1; common fluid return lines 7, 8 connected to a tank 6; a main circuit 9 for driving the left traveling motor 2 and a main circuit 10 for driving the right traveling motor 3, both being connected to the fluid supply line 5 and the return line 7; and a pump regulator 11 for controlling the discharge rate of the hydraulic pump 1 in such a manner that the discharge pressure of the hydraulic pump 1 becomes higher by a fixed value than the maximum one of load pressures of the plurality of actuators including the left and right traveling motors 2, 3. Although not shown, included among the plurality of actuators in addition to the left and right traveling motors 2, 3 are hydraulic cylinders for driving a boom, an arm, and so forth and/or a hydraulic motor for driving a swing in the case where a crawler-mounted construction vehicle is a hydraulic excavator, main circuits for driving these actuators also being connected to the fluid supply line 5 and the return line 7.

The main circuit 9 for the left traveling motor 2 comprises: two main lines 13, 14 each having one end connected to the common fluid supply line 5 via a fluid supply line 12 and the other end connected to one of the two ports of the left traveling motor 2; two control spool valves 15, 16 respectively disposed in the main lines 13, 14 and adapted to control the flow rate of the hydraulic fluid supplied from the hydraulic pump 1 to the left traveling motor 2; two pressure balance valves 17, 18 respectively disposed downstream of the control spool valves 15, 16 and adapted to effect the load-compensating control of the flow rate in such a manner that the differential pressure across the control spool valves 15, 16 becomes substantially fixed; check valves disposed in the main lines 13, 14 further downstream of the pressure balance valves 17, 18 and adapted to permit the flow of the hydraulic fluid directed to the traveling motor 2 alone; main return lines 22, 23 which respectively branch off from the main lines 13, 14 downstream of the check valves 19, 20 and which are connected to the common return line 7 via a return line 21; and pressure restricting valves 24, 25 respectively disposed in the main lines 22, 23 for setting back pressure and adapted to vary relief pressure in response to the pressure within the other main line 14 or 13. The operation of the control spool valves 15, 16 is respectively controlled by pilot pressure produced by pilot valves 26, 27, which are operated by a control lever (not shown) for the left traveling motor.

The main circuit 10 for the right traveling motor 3 is arranged in a similar manner. In other words, the main circuit 10 comprises: a fluid supply line 32; two main lines 33, 34; two control spool valves 35, 36; two pressure balance valves 37, 38; check valves 39, 40; a return line 41; main return lines 42, 43; and pressure restricting valves 44, 45 for setting back pressure. The operation of the control spool valves 35, 36 is respectively controlled by pilot valves 46, 47 controlled by a control lever (not shown) for the right traveling motor.

The main circuits of other actuators that are not shown are also arranged in a similar manner.

A pair of check valves 50, 51 which function as higher pressure selecting valves are connected between the main lines 13, 14 of the main circuit 9, while a pair of check valves 52, 53 which similarly function as higher pressure selecting valves are connected to the main lines 33, 34 of the main line 10. These check valves 50, 51 and 52, 53 are respectively connected to a common load line 56 via load lines 54, 55. Furthermore, similar load lines of the main circuits of other actuators are also connected to the common load line 56. By this arrangement, the highest one of load pressures of the plurality of actuators including the left and right traveling motors 2, 3 is introduced into the load lines 54–56 so as to detect the maximum load pressure.

The pressure balance valves 17, 18 comprise valve elements 60, 61 in which the output pressure of the control spool valves 15, 16 acts in the valve opening direction, while the maximum load pressure acts in the valve closing direction, and springs 62, 63 adapted to urge the valve elements 60, 61 in the valve opening direction. Meanwhile, the pressure balance valves 37, 38 similarly comprise valve elements 64, 65 in which the output pressure of the control spool valves 35, 36 acts in the valve opening direction, while the maximum load pressure acts in the valve closing direction, and springs 66, 67 adapted to urge the valve elements 64, 65 in the valve opening direction. These springs 62, 63 and 66, 67 serve as valve controlling means which operate as follows: During the driving of the left and right traveling motors 2, 3, i.e., while traveling, the springs 62, 63 and 66, 67 do not allow the valve elements 60, 61 and 64, 65 to operate until the pressure difference between the load pressure of the left traveling motor 2 and that of the right traveling motor 3 reaches a predetermined value $\Delta P_0$ determined by the strength of the springs, thereby maintaining the pressure balance valves 17, 18 and 37, 38 in the fully open state. When that pressure differential exceeds the predetermined value $\Delta P_0$, the springs 62, 63 and 66, 67 allow the valve elements 60, 61 or 64, 65 on the lower load pressure side to operate in the closing direction, thereby effecting the load-compensating control.

The pump regulator 11 comprises a hydraulic cylinder 70 for driving a swash plate of the hydraulic pump 1 so as to change the displacement volume and a control valve 71 for adjusting the displacement of the hydraulic cylinder 70. A spring 72 and a pressure-receiving chamber 73 into which the maximum load pressure is introduced are provided at one end of the control valve 71, while a pressure-receiving chamber 74 into which the pump discharge pressure is introduced is provided at the other end thereof. When the pressure differential between the discharge pressure of the hydraulic pump 1 and the maximum load pressure detected in the load line 56 becomes smaller than a setting of the spring 72, the control valve 71 moves leftward as viewed in the drawing so as to increase the rate of discharge of the hydraulic pump 1. When the differential pressure becomes greater than the set value of the spring 72, the control valve 71 moves rightward as viewed in the drawing, decreasing the rate of discharge of the hydraulic pump 1. Thus, the pump regulator 11 controls the rate of discharge of the pump 1 in such a manner that the discharge pressure of the hydraulic pump 1 becomes higher than the maximum load pressure by a fixed value determined by the setting of the spring 62.

A description will now be given of the operation of this embodiment arranged as described above.

First, the operating characteristics of the pressure balance valves 17, 18 and 37, 38 will be described.

As described above, the pressure balance valves 17, 18 are provided with springs 62, 63 and 66, 67 serving as valve controlling means which operate as follows: During the driving of the left and right traveling motors 2, 3, i.e., while traveling, the springs 62, 63 and 66, 67 do not allow the valve elements 60, 61 and 64, 65 to operate until the pressure difference between the load pressure of the left traveling motor 2 and that of the right traveling motor 3 reaches the predetermined value $\Delta P_0$, thereby maintaining the pressure balance valves 17, 18 and 37, 38 in the fully open state. When that pressure differential exceeds the predetermined value $\Delta P_0$, the springs 62, 63 and 66, 67 allow the valve elements 60, 61 or 64, 65 on the lower load pressure side to operate in the closing direction, thereby effecting the load-compensating control. Accordingly, when the left and right traveling motors 2, 3 are driven by, for instance, opening the control spool valves 15, 35 by the same degree of opening, the flow rate of the hydraulic fluid passing through the control spool valve 15 or 35 associated with the lower load pressure side traveling motor 2 or 3 is controlled in response to an increase in the differential between the load pressures of the left and right traveling motors 2, 3, as shown in FIG. 2.

More specifically, when the pressure differential $\Delta P$ of the left and right traveling motors 2, 3 is not more than a predetermined value $\Delta P_0$, neither of the pressure balance valves 17, 37 is operative, and both pressure balance valves 17, 37 are maintained in the fully open state. At this time, if an increase in the pressure differential $\Delta P$ is attributable to an increase in maximum load pressure, the rate of discharge by the hydraulic pump 1 increases through control by the pump regulator 11. Accordingly, the flow rate across the control spool valves 15, 35 increases together with increase in the differential pressure $\Delta P$. When the differential pressure between the load pressures of the left and right traveling motors 2, 3 exceeds the predetermined value $\Delta P_0$, the valve element 60 or 64 of the pressure balance valve 17 or 37 associated with the lower load pressure side traveling motor 2 or 3 is operated in the valve closing direction, and its opening is restricted. Consequently, this restricts an increase in the flow rate across the control spool valve 15 or 35 resulting from the fact that the traveling motor 2 or 3 is on the lower load pressure side, and control is hence effected in such a manner that the flow rate across the control spool valve 15 or 35 becomes fixed. That is, the flow rate across the control spool valve 15 or 35 is subjected to load-compensating control in such a manner as to coincide with the flow rate corresponding to the valve opening.

A description will now be given of the overall operation of the hydraulic drive system.

When attempting to effect the straight traveling of the vehicle, the operator operates both of control levers (not shown) for right and left traveling motors, which in turn actuates the pilot valves 26, 46, thereby opening the control spool valves 15, 35 to the degree desired, this degree being the same for the two spool valves 15, 35. As a result, the hydraulic fluid from the hydraulic pump 1 passes through the control spool valves 15, 35, passes through the pressure balance valves 17, 37 set in the fully open state due to the springs 62, 66, and flows into the left and right traveling motors 2, 3, thereby rotating the left and right traveling motors 2, 3. At this time, if the resistance to which the left and right crawler belts are subjected is identical and the load applied to the left and right traveling motors 2, 3 is identical, the load pressures generated in the left and right traveling motors 2, 3 also becomes identical. Hence, this identical load pressure is detected as the maximum load pressure in the load line 56. For this reason, the valve elements 60, 64 of the pressure balance valves 17, 37 are not actuated, and the pressure balance valves 17, 37 remain fully open, so that equivalent amounts of hydraulic fluid corresponding to the openings of the control spool valves 15, 35 are supplied to the left and right traveling motors 2, 3. Consequently, the left and right traveling motors 2, 3 are caused to rotate at the same speed by the supply of this hydraulic fluid, thereby effecting the straight traveling of the vehicle. The hydraulic fluid that has rotated the left and right traveling motors 2, 3 is returned to the tank 6 via the pressure restricting valves 25, 45 for setting back pressure.

It is now assumed that, during straight traveling by the driving of the left and right traveling motors 2, 3, the resistance to which the left crawler belt is subjected has become greater than that to which the right crawler belt is subjected, and the load pressure of the left traveling motor 2 has thereby become greater than that of the right traveling motor 3. In such a case, the differential between the load pressures acts in the valve closing direction on the valve element 64 of the pressure balance valve 37 associated with the right traveling motor 3, i.e., the lower load pressure side actuator. However, in the range in which that differential pressure is smaller than the value $\Delta P_0$ set by the spring 66, the valve element 64 of the pressure balance valve 37 is not actuated, as described before, and the pressure balance valve 37 is hence kept in the fully open state. The differential pressure does not act on the valve element of the pressure balance valve 17 associated with the left traveling motor 2, i.e., the higher load pressure side actuator, so that the pressure balance valve 17 naturally remains in the fully open state. Accordingly, the left and right traveling motors 2, 3 assume a state in which they are not provided with the pressure balance valves 17, 37, and are connected in parallel. Hence, in the same way as the case of a general hydraulic circuit in which the left and right traveling motors are connected in parallel, the flow rates of hydraulic fluid supplied to the left and right traveling motors 2, 3 are forcedly made equivalent by the forces presented by the crawler belts themselves to maintain the straight traveling of the vehicle, thereby effecting straight traveling.

Also in a case where the load pressure of the right traveling motor 3 has, contrary to the above case, become greater than that of the left traveling motor 2, the pressure balance valves 17, 37 are similarly maintained in the fully open state, and the flow rates of hydraulic fluid supplied to the left and right traveling motors 2, 3 are forcedly made equivalent by the forces of the crawler belts themselves to maintain straight traveling, thereby effecting straight traveling.

When changing the advancing direction of the vehicle, e.g., when turning to the right, the operator operates the control lever for the left traveling motor 2 by a greater degree than the control lever for the right traveling motor 3, thereby setting the opening of the control spool valve 15 to a greater degree than that of the control spool valve 35. Consequently, with respect to the flow rates of hydraulic fluid supplied to the left and right traveling motors 2, 3 from the hydraulic pump 1 via the control spool valves 15, 35 and the pressure balance valves 17, 37, the flow rate for the left traveling motor 2 becomes larger than that of the right traveling motor 2, so that the vehicle is moved to turn to the right.

Thus, when the vehicle is moved to turn to the right, the resistance to which the left crawler belt is subjected becomes greater than that to which the right crawler belt is subjected. Correspondingly, the load pressure of the left traveling motor 2 becomes higher than the load pressure of the right traveling motor 3, with the result that a relatively large pressure differential not less than the value $\Delta P_0$ set by the springs 62, 66 of the pressure balance valves 17, 37 occurs between the two load pressures. Consequently, the valve element 64 of the pressure balance valve 37 associated with the right traveling motor 3, i.e., the lower load pressure side actuator is moved in the valve closing direction. Hence, the pressure balance valve 37 operates in a region where the flow rate Q is fixed as shown in FIG. 2, thereby controlling the differential pressure across the control spool valve 35 to a fixed level, i.e., effecting the load-compensating control of the rate of flow across the control spool valve 35. As a result of the fact that the rate of flow across the control spool valve 35 is thus subjected to load-compensating control, the preferential supply of the hydraulic fluid to the right traveling motor 3 is restricted, and hydraulic fluid of a fixed flow rate corresponding to the opening of the control spool valve 15 is supplied to the higher load pressure side left traveling motor 2. Consequently, the vehicle turns rightward, as instructed by the control lever.

As described above, in this embodiment, when an attempt is made to effect the straight traveling of the vehicle, since the pressure balance valves 17, 18 and 37, 38 are set in the nonoperative state, i.e., in the fully open state, it is possible to make use of the straight traveling-maintaining forces which the left and right crawler belts possess. On the other hand, when changing the advancing direction of the vehicle, the actuation of the pressure balance valves 17, 18 or 37, 38 associated with the lower load pressure side traveling motor makes it possible to effect a change in the advancing direction by performing the load-compensating control of the rate of flow across the control spool valve 15, 16, 35, 36.

In addition, fabrication errors are usually present in hydraulic devices constituting a hydraulic drive system, including the control spool valves 15, 16, 35, 36, the pressure balance valves 17, 18 and 37, 38, etc., and, generally speaking, there are variations in the performance on the basis of those fabrication errors. If straight traveling is performed by the load-compensating control of the pressure balance valves 17, 18 and 37, 38, these variations in the performance appear as the differential between the flow rates of hydraulic fluid supplied to the left and right traveling motors 2, 3. Hence, there emerges a situation in which the vehicle fails to perform straight traveling despite the fact the operator operates the left and right traveling control levers by the same degrees. Accordingly, the operator must always operate the control levers while monitoring the actual advancing direction, so that substantial labor is required of the operator. In addition, if the strokes of the control levers undergo any slightest change, the openings of the control spool valves 15, 16, 35, 36 also change. In this case, if straight traveling is performed by the load-compensating control of the pressure balance valves 17, 18 and 37, 38, the flow rates of hydraulic fluid supplied to the left and right traveling motors change, hampering the straight traveling. Accordingly, the operator must exercise the utmost care not to move the strokes of the control levers once set, and in this case as well, a substantial burden is imposed on the operator.

In contrast, in accordance with this embodiment, since the pressure balance valves 17, 18 and 37, 38 are set in the nonoperative state, and the rates of flow of hydraulic fluid supplied to the left and right traveling motors 2, 3 are forcedly made equivalent by the straight traveling-maintaining forces of the crawler belts themselves so as to effect straight traveling, even if there are any variations in the performance of these hydraulic devices or any changes in the positions of the control levers, these variations and changes do not appear as the differential between the flow rates of hydraulic fluid supplied to the left and right traveling motors, and do not affect the straight traveling, making it possible to effect straight traveling positively. Accordingly, the burden imposed on the operator can be mitigated substantially.

Second Embodiment

Figure 3:
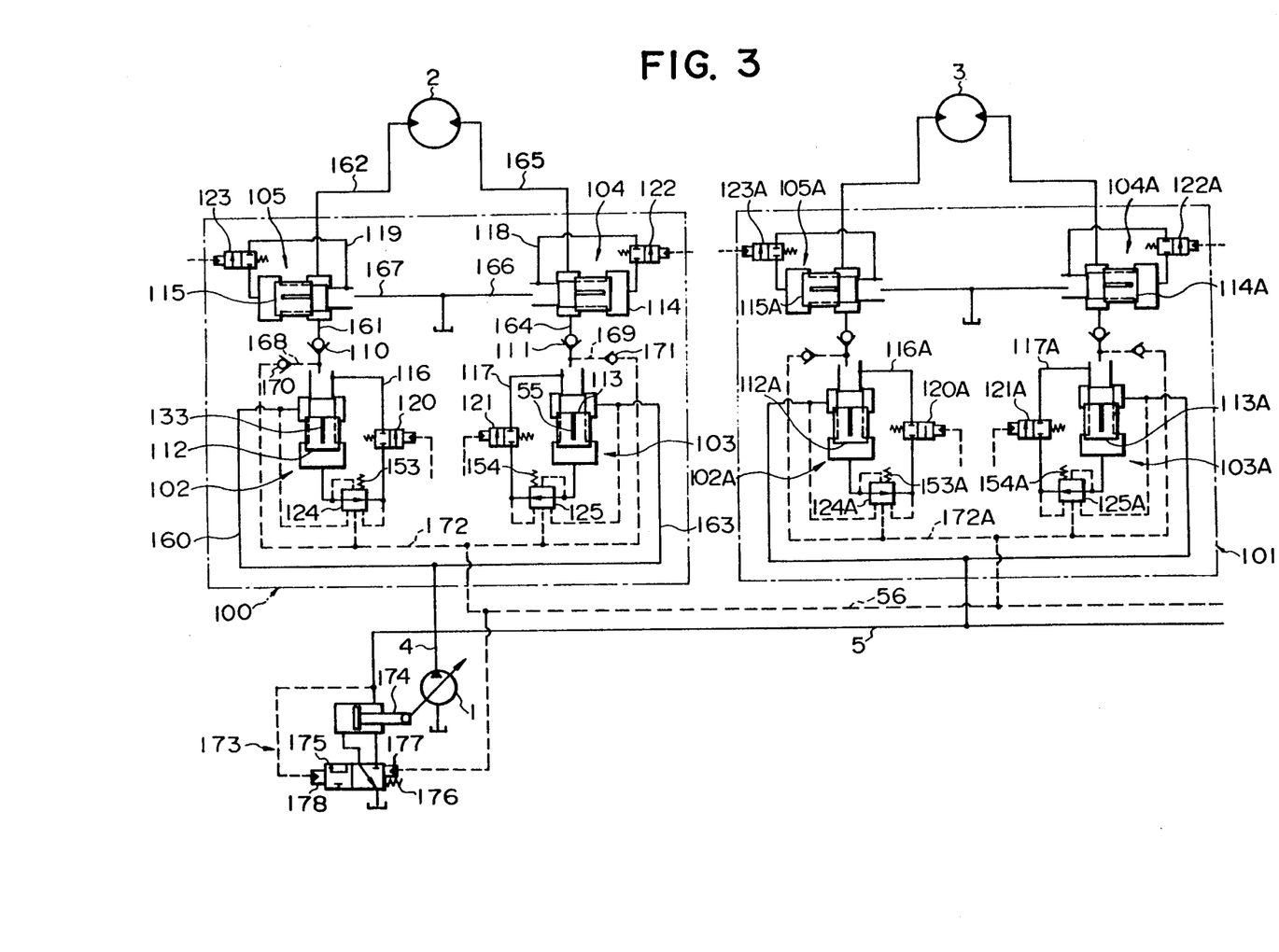
FIG. 3 is a hydraulic circuit diagram of a hydraulic drive system in accordance with another embodiment of the present invention.
Figure 4:
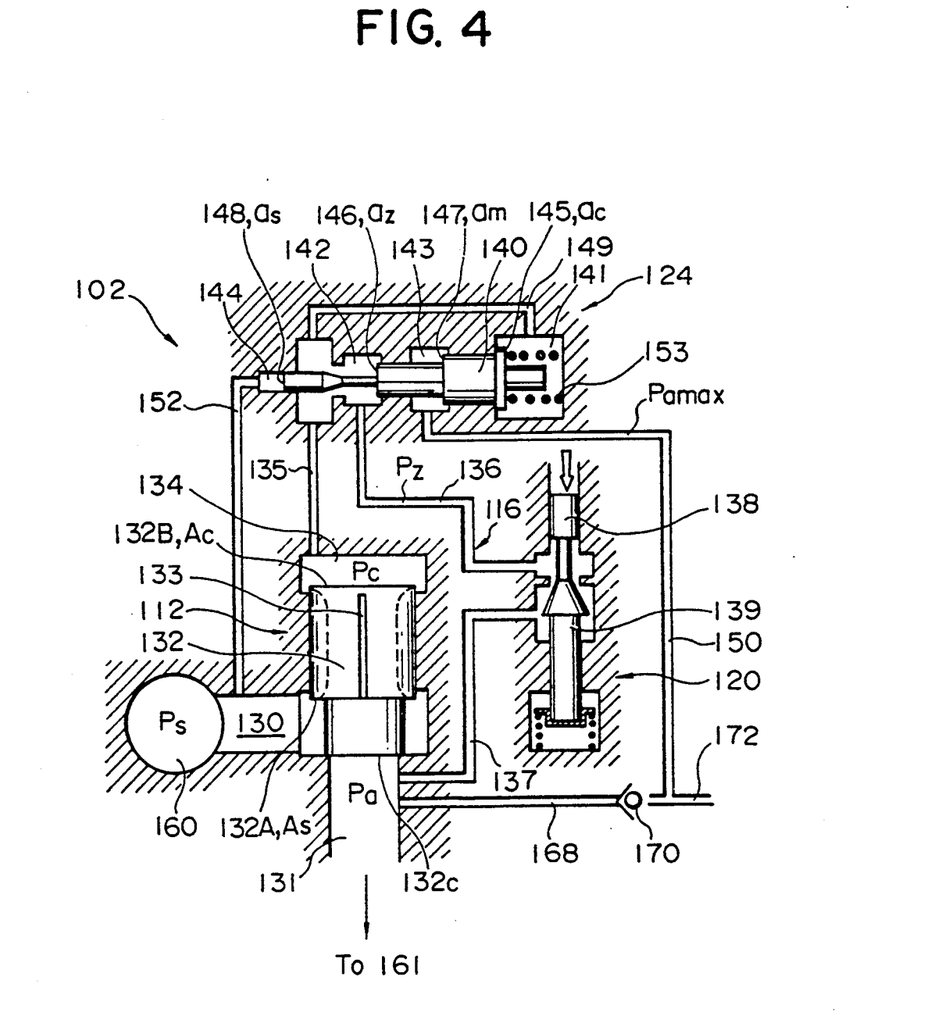
FIG. 4 is a cross-sectional view illustrating an essential part of the hydraulic drive system shown in FIG. 3.

Referring now to FIGS. 3 and 4, a description will be given of a second embodiment of the present invention. In the drawings, those components that are equivalent to those shown in FIG. 1 are denoted by the same reference numerals. This embodiment is an example in which, instead of the spool valves, seat valve assemblies are used as flow control valves.

In FIG. 3, first and second flow control valves 100, 101 are disposed between the hydraulic pump 1 and the left and right traveling motors 2, 3, respectively. The flow control valves 100, 101 are respectively composed of four seat valve assemblies, i.e., first to fourth seat valve assemblies 102 to 105 and 102A to 105A.

In the first flow control valve 100, the first seat valve assembly 102 is provided in meter-in circuits 160-162 which are main circuits when the left traveling motor 2 is rotated rightward. The second seat valve assembly 103 is provided in meter-in circuits 163-165 which are main circuits when the left traveling motor 2 is rotated leftward. The third seat valve assembly 104 is provided between the left traveling motor 2 and the second seat valve assembly 103 in meter-out circuits 165-166 which are main circuits when the left traveling motor 2 is rotated rightward. The fourth seat valve assembly 105 is provided between the left traveling motor 2 and the first seat valve assembly 102 in meter-out circuits 162-167 which are main circuits when the left traveling motor 2 is rotated leftward.

The meter-in circuit 161 disposed between the first seat valve assembly 102 and the fourth seat valve assembly 105 is provided with a check valve 110 for preventing the back flow of the hydraulic fluid flowing to the first seat valve assembly, while the meter-in circuit 164 disposed between the second seat valve assembly 103 and the third seat valve assembly 103 is provided with a check valve 111 for preventing the back flow of hydraulic fluid flowing to the second seat valve assembly. In addition, load lines 168, 169 are respectively connected to the upstream side of the check valve 110 of the meter-in circuit 161 and the upstream side of the check valve 111 of the meter-in circuit 164, a common load line 172 being connected to the load lines 168, 169 via check valves 170, 171, respectively.

In the second flow control valve 101 as well, the first to fourth seat valve assemblies 102A to 105A are arranged in a similar manner, and a load line 172A similar to the load line 172 is provided therein.

The two load lines 172, 172A are connected to each other via another common load line 56, and the highest one of load pressures of the plurality of actuators including the left and right traveling motors 2, 3 is introduced into the load lines 172, 172A, 56 so as to detect the maximum load pressure.

In the first flow control valve 100, the first to fourth seat valve assemblies 102-105 have seat valve-type main valves 112–115, pilot circuits 116–115 for the main valves, and pilot valves 120–123 arranged in the pilot circuits. The first and second seat valve assemblies 102, 103 further have pressure balance valves 124, 125 for load-compensating control arranged upstream of the pilot valves of the pilot circuits.

A detailed structure of the first seat valve assembly 102 will be described with reference to FIG. 4.

In the first seat valve assembly 102, the seat-type main valve 112 has a valve element 132 for opening and closing an inlet 130 and an outlet 131, the valve element 132 being provided with a plurality of slits that function as a variable restrictor 133 for changing the opening in proportion to the position of the valve element 132, i.e., the opening of the main valve. A back pressure chamber 134 communicating with the inlet 130 via the variable restrictor is formed on the side of the valve element 132 opposite to the side where the outlet 131 is provided. In addition, the valve element 132 is provided with a pressure-receiving portion 132A for receiving the inlet pressure of the main valve 112, i.e., the discharge pressure Ps of the hydraulic pump 1, a pressure-receiving portion 132B for receiving the pressure of the back pressure chamber 134, i.e., back pressure Pc, and a pressure-receiving portion 132C for receiving the output pressure Pa of the main valve 112.

The pilot circuit 116 is composed of pilot lines 135–137 allowing the back pressure chamber 134 to communicate with the output 131 of the main valve 112. The pilot valve 120 is composed of a valve element 139 driven by a pilot piston 138 to provide a variable restrictor for opening and closing a passage between the pilot line 136 and the pilot line 137. The pilot piston 138 is driven by pilot pressure produced in correspondence with an amount of operation of the control lever (not shown).

The arrangement of the seat valve assembly having the main valve 112 and the pilot valve 120 in combination but not including the pressure balance valve 124 is known from U.S. Pat. No. 4,535,809. In this known arrangement, if the pilot valve 120 is operated, pilot flow of a rate corresponding to the opening of the pilot valve 120 takes place in the pilot circuit 116, and this causes the main valve 112 to be opened to a degree proportional to the pilot flow rate by virtue of the variable restrictor 133 and the back pressure chamber 134, so that the hydraulic fluid of a main flow rate amplified in proportion to the pilot flow rate flows from the inlet 130 to the outlet 131 via the main valve 112.

The pressure balance valve 124 for load-compensating control has a valve element 140 constituting a variable restrictor, a first pressure-receiving chamber 141 for urging the valve element 140 in the valve opening direction, and second, third, and fourth pressure-receiving chambers 142, 143, 144 opposed to the first pressure-receiving chamber and adapted to urge the valve element 140 in the valve closing direction. The valve element 140 is provided with first to fourth pressure-receiving portions 145–148 respectively corresponding to the first to fourth pressure-receiving chambers 141–144. The first pressure-receiving chamber 141 is communicated with the back pressure chamber 134 of the main valve 112 via the pilot lines 149, 135; the second pressure-receiving chamber 142 is communicated with the pilot line 136; the third pressure-receiving chamber 143 is communicated with the maximum load line 172 via the pilot line 150; and the fourth pressure-receiving chamber 144 is communicated with the inlet 130 of the main valve 112 via the pilot line 152. By virtue of this arrangement, the pressure of the back pressure chamber, i.e., the back pressure Pc, is introduced into the first pressure-receiving portion 145; the inlet pressure Pz of the pilot valve 120 is introduced into the second pressure-receiving portion 146; the maximum load pressure Pamax is introduced into the third pressure-receiving portion 147; and the discharge pressure Ps of the hydraulic pump 1 is introduced into the fourth pressure-receiving portion.

The pressure-receiving areas of these pressure-receiving portions are determined as follows: If it is assumed that the pressure-receiving area of the first pressure-receiving portion 145 is ac, the pressure-receiving area of the second pressure-receiving portion 146 is az, the pressure-receiving area of the third pressure-receiving portion 147 is am, and the pressure-receiving area of the fourth pressure-receiving portion 148 is as, and that the pressure-receiving area of the pressure-receiving portion 132A in the valve element 132 of the aforementioned main valve 112 is As, the pressure-receiving area of the pressure-receiving portion 132B is Ac, and a ratio between the two pressure-receiving areas As/Ac=K (K<1), the pressure-receiving areas ac, az, am, and as are set in the proportions of $1:1-K:K(1-K):K^2$.

In addition, a spring 153 for urging the valve element 140 in the valve opening direction is provided in the first pressure-receiving chamber 141.

A detailed structure of the second seat valve assembly 103 is identical to that of the first seat valve assembly 102, and, in FIG. 3, a spring is designated at numeral 154 in correspondence with the spring 153 of the pressure balance valve 124.

Detailed structures of the third and fourth seat assemblies 104, 105 are identical to that of the first seat valve assembly 102 with the pressure balance valve 124 thereof removed.

The arrangements of the first to fourth seat valve assemblies 102A–105A in the second flow control valve 101 are respectively identical to those of the seat valve assemblies 102–105 of the first flow control valve 100. In FIG. 3, components of the first to fourth seat valve assemblies 102A–105A are denoted by adding "A" to the reference numerals of the corresponding seat valve assemblies 102–105, as required.

In the above-described arrangement, the springs 153, 154, 153A, 154A of the pressure balance valves 124, 125, 124A, 125A respectively serve as valve controlling means for effecting the load-compensating control of the flow rates across the main valves 112, 113, 112A, 113A. Specifically, this load-compensating control is carried out as follows: During the driving of the left and right traveling motors 2, 3, these springs 153, 154, 153A, 154A do not actuate the pressure balance valves until the differential pressure between their load pressures reaches a predetermined value $\Delta P_0\{=S/K(1-K)\}$ or more, thereby maintaining the pressure balance valves in the fully open state, but they actuate the pressure balance valve associated with the lower load pressure side traveling motor when that differential pressure exceeds the predetermined value $\Delta P_0$.

In the same way as the first embodiment, the hydraulic pump 1 is provided with a pump regulator 173 for controlling the discharge rate of the hydraulic pump 1 in such a manner that the discharge pressure of the hydraulic pump 1 becomes higher by a fixed value than the maximum one of load pressures of the plurality of actuators including the left and right traveling motors 2, 3.

The pump regulator 173 comprises a hydraulic cylinder 174 for driving the swash plate of the hydraulic pump 1 and changing the displacement volume, and a control valve 175 for adjusting the displacement of the hydraulic cylinder 174. A spring 176 and a pressure-receiving chamber 177 into which the maximum load pressure is introduced are provided at one end of the control valve 175, while a pressure-receiving chamber 178 into which the pump discharge pressure is introduced is provided at the other end thereof. The operation of the hydraulic cylinder 174 and the control valve 175 is basically identical with that of the hydraulic cylinder 70 and the control valve 71 in the first embodiment.

The operation of this embodiment thus constructed will be described hereafter.

First, a description will be given of the first and second valve assemblies 102, 103 and 102A, 103A in the first and second flow control valves 100, 101 by citing the first seat valve assembly 102 as a typical example.

In the first seat valve assembly 102, the combination of the main valve 112 and the pilot valve 120 is known, as described above, and main flow takes place in the main valve 112 at a rate which is amplified in proportion to the pilot flow rate formed in the pilot circuit 116 by the operation of the pilot valve 120. When the main valve 112 is thus operative, the balance of forces acting on the main valve element 132 can be expressed by the following formula from the aforementioned relationships of $As/Ac = K(K<1)$:

$$Pc = KPs + (1-K) Pa \qquad (1)$$

Meanwhile, if the balance of forces acting on the valve element 143 in the pressure balance valve 124 is considered, since, as described above, the pressure-receiving area ac of the pressure-receiving portion 145 is 1, the pressure-receiving area az of the pressure-receiving portion 146 is $1-K$, the pressure-receiving area am of the pressure-receiving portion 147 is $K(1-K)$, and the pressure-receiving area as of the pressure-receiving portion 148 is $K^2$, if the force of the spring 153 is assumed to be S, the following formula holds:

$$Pc + S = (1-K) Pz + K(1-K) Pamax + K^2 Ps \qquad (2)$$

If the differential pressure $Pz - Pa$ between the inlet pressure and outlet pressure of the pilot valve 120 is determined from this formula (2) and the aforementioned formula (1), we have $$Pz - Pa = K(Ps - Pamax) + S/(1-K)/ \qquad (3)$$

Accordingly, the pressure balance valve 124 controls the flow rate across the pilot valve 120 in such a manner that the differential pressure across the pilot valve 120 agrees with the value of the right-hand side of this formula (3).

Here, in the aforementioned formula (3), the first term of the right-hand side, $Ps - Pamax$, is the differential pressure between the maximum load pressure and the discharge pressure of the hydraulic pump 1 controlled by the pump regulator 173, and remains constant before the discharge rate of the hydraulic pump 1 becomes saturated, but decreases in correspondence with the degree of saturation after the discharge rate is saturated. In addition, this differential pressure is common to all the pressure balance valves 124, 125, 124A, 125A. Furthermore, the first and second terms of the right-hand side, the ratio of the pressure-receiving area K and the spring force S become common to all the pressure balance valves 124, 125, 124A, 125A if the ratios of the pressure-receiving area K of the main valves 112, 113, 112A, 113A and all the springs 153, 154, 153A, 154A are designed to be identical.

Accordingly, even if a differential arises between the load pressures of the left and right traveling motors 2, 3 during the driving of the left and right traveling motors 2, 3, the pressure balance valves 124, 125, 124A, 125A basically control the differential pressure across the pilot valves 120, 121, 120A, 121A in such a manner as to be maintained at the common and same level so as to control the flow rates across the pilot valves 120, 121, 120A, 121A to fixed levels, thereby effecting the load-compensating control of the flow rates across the main valves 112, 113, 112A, 113A.

The above-described functions are the basic functions of the pressure balance valves 124, 125, 124A, 125A.

The differential pressure across the pilot valve 120 becomes maximum when the pressure balance valve 124 is in the fully open state, and this maximum differential pressure agrees with $Pc - Pa$, and therefore this differential pressure can be determined from the aforementioned formula (1) as follows:

$$Pz - Pa = Pc - Pa = K(Ps - Pa) \qquad (4)$$

If a case is considered where the left and right traveling motors 2, 3 are driven simultaneously, and the load pressure of the left traveling motor 2 is higher than that of the right traveling motor 3, the self load pressure agrees with the maximum load pressure Pamax in formulae (4), so formula (4) can be translated as:

$$Pz - Pa = K(Ps - Pamax) \qquad (5)$$

Accordingly, through a comparison between formulae (3) and (5), the pressure balance valve 124 attempts to control the differential pressure across the pilot valve 120 into $K(Ps - Pamax) + S/(1-K)$. However, since the differential pressure across the pilot valve 120 does not exceed $K(Ps - Pamax)$, so that the pressure balance valve 124 is maintained in the fully open state.

In contrast, in a case where the load pressure of the left traveling motor 2 is lower than that of the right traveling motor 3, through a comparison between formulae (3) and (4), while $K(Ps - Pamax) + S/(1-K) > K(Ps - Pa)$, the pressure balance valve 124 attempts to control the differential pressure across the pilot valve 120 into $K(Ps - Pamax) + S/(1-K)$. At this time as well, since the differential pressure across the pilot valve 120 does not exceed $K(Ps - Pa)$, the pressure balance valve 124 is maintained in the fully open state. Meanwhile, when $K(Ps - Pamax) + S/(1-K) < K(Ps - Pa)$, it becomes possible to control the differential pressure across the pilot valve 120 into $K(Ps - Pamax) + S/(1-K)$. Hence, the state of the pressure balance valve 124 changes from the fully open state to a restricted state, and the pressure balance valve 124 thus controls the differential pressure of the pilot valve 120 in such a manner as to make said differential pressure agree with $K(Ps - Pamax) + S/(1-K)$, which is a value smaller than the maximum value $K(Ps - Pa)$.

That is, with $K (Ps-Pamax)+/(1-K)=K (Ps-Pa)$ serving as a turning point, the pressure balance valve 124 is not actuated in a state in which $K (Ps-Pamax)+S/(1-K) > K (Ps-Pa)$, and the pressure balance valve 124 is actuated only when $K (Ps-Pamax)+S/(1-K) < K (Ps-Pa)$, effecting the load-compensating control of the rate of flow across the pilot valve 120.

The equation $K (Ps-Pamax)+/(1-K)=K (Ps-Pa)$ can be modified as follows:

$$Pamax-Pa=S/K (1-K) \qquad (6)$$

In this formula (6), the left-hand side represents the differential pressure between the load pressure Pa of the left traveling motor 2 and the maximum load pressure Pamax (load pressure of the right traveling motor 3), while the right-hand side represents a fixed value determined by the spring force S of the spring 153 and the area ratio K of the main valve 112, and can be replaced by a predetermined value $\Delta P_0$.

The same operation as that of the pressure balance valve 124 holds true of the pressure balance valves 125, 124A, 125A of the second seat valve assembly 103 of the first flow control valve 100 and the first and second seat valve assemblies 102A, 103A of the second flow control valve 101.

Thus, the pressure balance valves 124, 125 and 124A, 125A have virtually the same operating characteristics as those of the pressure balance valves 17, 18 and 37, 38 in the first embodiment described with reference to FIG. 2.

That is, when the left and right traveling motors 2, 3 are driven by opening the pilot valves 120, 120A by the same degrees, in a range in which the differential pressure $\Delta P$ between the load pressures of the left and right traveling motors 2, 3 is not more than $\Delta P_0\{=S K (1-K)\}$, neither of the pressure balance valves 124, 124A is actuated, and both pressure balance valves 124, 124A are maintained in the fully open state. At this juncture, if it is assumed that an increase in the differential pressure $\Delta P$ is due to an increase in the maximum load pressure, the discharge rate of the hydraulic pump 1 increases by control of the pump regulator 11. Accordingly, the flow rates of the hydraulic fluid passing through the main valves 112, 112A increase with an increase in the differential pressure $\Delta P$. When the differential pressure between the load pressures of the left and right traveling motors 2, 3 exceeds the predetermined value $\Delta P_0$, the valve element 140 of the pressure balance valve 124 or 124A associated with the lower load pressure side traveling motor 2 or 3 is moved in the valve closing direction, thereby restricting the opening. For this reason, an increase of the rates of flow through the pilot valve 120 or 120A and the main valve 112 or 112A due to the fact that the traveling motor 2 or 3 is the lower load pressure side is suppressed, and control is effected in such a manner that the rate of flow through the main valve 112 or 112A becomes fixed. In other words, the rate of flow through the main valve 112 or 112A is subjected to load-compensating control in such a manner as to correspond to a flow rate corresponding to the opening of the pilot valve 120 or 120A.

As described above, since the pressure balance valves 124, 125, 124A, 125A function in the same way as the pressure balance valves of the first embodiment, the hydraulic drive system in accordance with this embodiment operates in a manner similar to that of the first embodiment, as described below.

In short, when the vehicle is made to travel straight, control levers (not shown) for left and right traveling motors are operated to cause the pilot valves 120, 120A to open by the same degrees, for instance. Consequently, pilot flow of equal flow rates takes place in the pilot circuits 116, 116A, while flow of equal rates amplified in proportion thereto takes place in the main valves 112, 112A as well, thereby supplying the hydraulic fluid at equal flow rates to the left and right traveling motors 2, 3. At this time, when the resistance to which the left and right crawler belts are subjected differs, and when there is a difference in the load pressure between the left and right traveling motors 2, 3, the pressure balance valves 124, 124A are not actuated and remain in the fully open state if the differential pressure is less than the predetermined value $\Delta P_0$. Hence, the left and right motors 2, 3 remain in the same condition as that in which they are connected in parallel. Consequently, in the same way as a general hydraulic circuit in which left and right traveling motors are connected in parallel, the flow rates of the hydraulic fluid supplied to the left and right traveling motors 2, 3 are forcedly made identical by the straight traveling-maintaining forces possessed by the crawler belts themselves, thereby effecting the straight traveling.

In addition, since the straight traveling is forcedly effected by the straight traveling-maintaining forces of the crawler belts themselves with the pressure balance valves 124, 124A thus set in the nonoperative state, even if there are any variations in the performance of the hydraulic devices such as the main valves 112, 112A, the pilot valves 120, 120A, the pressure balance valves 124, 124A due to the fabrication errors or any slightest changes in the strokes of the control levers, insofar as the differential pressure between the load pressures is not more than the predetermined value $\Delta P_0$, unnecessary load-compensating control is not effected and the intended straight traveling is not hampered.

When the advancing direction of the vehicle is to be changed, for instance, when the vehicle is to be turned to the right, one control lever is operated by a greater degree than the other control lever, so that, for instance, the opening of the pilot valve 120 of the first seat valve assembly 102 is set to a greater degree. As a result, the amount of hydraulic fluid supplied to the left traveling motor 2 increases, so that the differential pressure between the load pressures of the left and right traveling motors 2, 3 becomes the predetermined value $\Delta P_0$ or more, and the pressure balance valve 124A associated with the lower load pressure side right traveling motor 3 is actuated. The differential pressure across the pilot valve 120A is thereby controlled to a fixed level, so that an increase in the rate of flow through the main valve 112A is suppressed, and the hydraulic fluid is supplied to the left and right traveling motors 2, 3 at a rate corresponding to the amounts of opening of the pilot valves 120, 120A. Hence, the vehicle turns to the right, as instructed by the control levers.

Thus, in this embodiment as well, it is possible to effect the straight traveling of the vehicle and a change in its advancing direction. At the same time, the straight traveling is effected by making use of the straight traveling-maintaining forces possessed by the crawler belts themselves with the pressure balance valves 124, 125 and 124A, 125A set in the nonoperative state. Accordingly, even if there are variations in the performance of the hydraulic devices or any changes in the strokes of the control levers, it is readily possible to effect the straight traveling with such variations and changes exerting an influence on the straight traveling. Hence, it is possible to substantially mitigate the burden imposed on the operator when effecting a straight traveling.

In the above-described second embodiment, as described above, the following arrangement is adopted as the meter-in circuit-side seat valve assemblies 102, 103 and 102A, 103A: The pressure balance valves 124, 125, 124A, 125A for load-compensating control are disposed upstream of the pilot valves 120, 121, 120A, 121A. The pressure balance valve is provided with the first pressure-receiving portion 145 for urging the valve in the valve opening direction and the second, third and fourth pressure-receiving portions 146-148 for urging the valve in the valve closing direction. The pilot valve inlet pressure Pz, the maximum load pressure Pamax, and the pump discharge pressure Ps are introduced into these pressure-receiving portions 145-148. The pressure-receiving areas of these pressure-receiving portions are set in the proportions of $1:1-K:K(1-K):K^2$. However, on June 30, 1988, the assignee of the present invention filed an application for patent for an invention concerning a flow control valve comprising seat valve assemblies each having a special load compensating function, as Japanese Patent Application No. 63-163646. Thus, various modifications of the construction and arrangement of the seat valve assembly are possible in accordance with the concept of the invention of this earlier application.

For instance, with respect to the pressure balance valve, it suffices if the aforementioned formula (3) ultimately holds. In other words, the pressure balance valve may take any form or arrangement insofar as the pressure balance valve is actuated in the valve opening direction in response to the pressure differential between the discharge pressure of the hydraulic pump 1 and the higher one of load pressures of the left and right traveling motors 2, 3, is actuated in the valve closing direction in response to the differential pressure across the pilot valve, and is provided with a spring for urging the valve in the valve opening direction.

Third Embodiment

Figure 5:
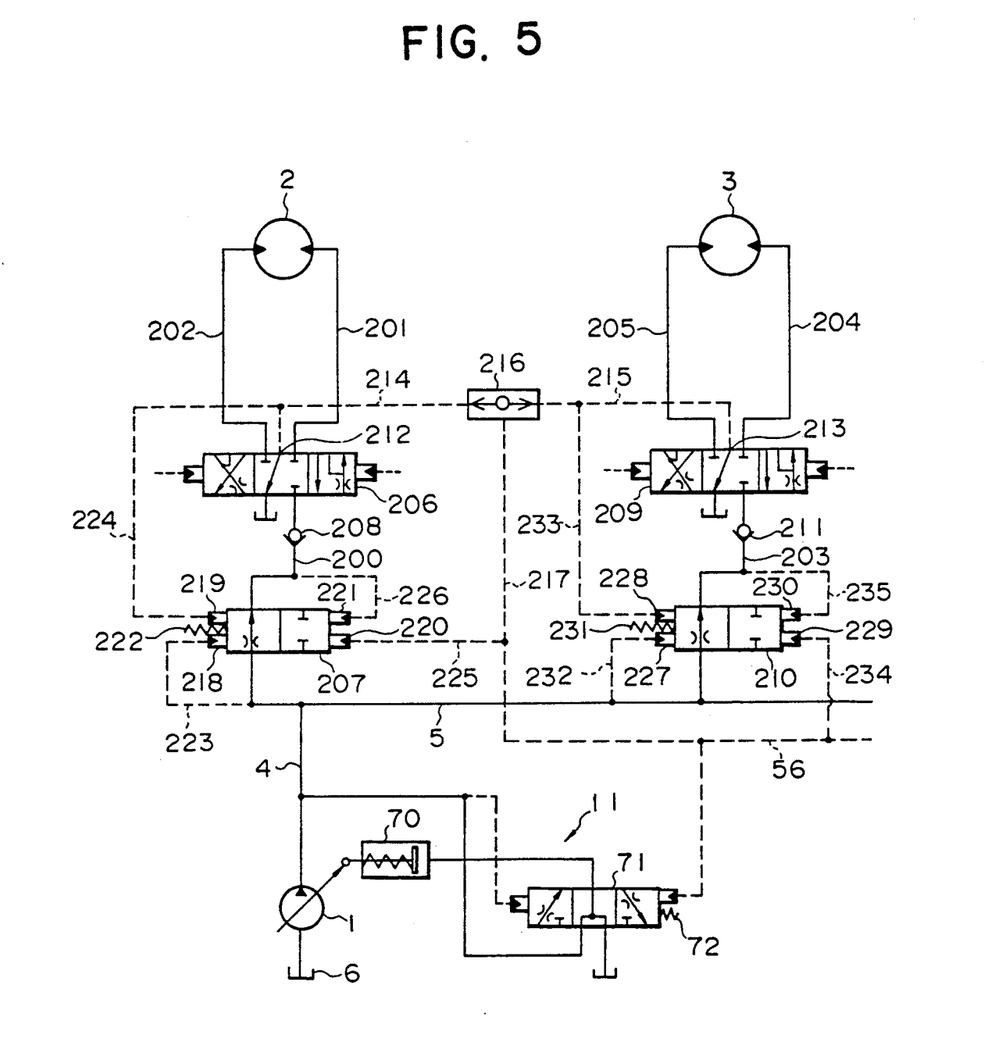
FIG. 5 is a pressure circuit diagram of a hydraulic drive system in accordance with still another embodiment of the present invention.

Referring now to FIG. 5, a description will be given of a third embodiment of the present invention.

In the drawing, those members that are equivalent to the members shown in FIG. 1 are denoted by the same reference numerals. This embodiment is an example in which a general load compensating valve is used as the pressure balance valve.

In FIG. 5, the hydraulic drive system in accordance with this embodiment comprises the following components: main lines 200-202 constituting a main circuit for driving the left traveling motor 2; main lines 203-205 constituting a main circuit for driving the right traveling motor 3; a flow control valve 206 disposed in the main lines 200-202 and adapted to control the flow rate of the hydraulic fluid supplied from the hydraulic pump 1 to the left traveling motor 2; a pressure balance valve 207 disposed in the main line 200 upstream of the flow control valve 206 and adapted to control the rate of flow through the flow control valve 206 in such a manner that the differential pressure across the flow control valve 206 becomes substantially fixed, thereby effecting load-compensating control; a check valve 208 disposed between the flow control valve 206 and the pressure balance valve 207 and adapted to permit only the flow of the hydraulic fluid directed to the traveling motor 2; a flow control valve 209 disposed in the main lines 203-205 and adapted to control the flow rate of the hydraulic fluid supplied from the hydraulic pump 1 to the left traveling motor 3; a pressure balance valve 210 disposed in the main line 203 upstream of the flow control valve 209 and adapted to control the rate of flow through the flow control valve 209 in such a manner that the differential pressure across the flow control valve 209 becomes substantially fixed, thereby effecting load compensating control; and a check valve 211 disposed between the flow control valve 209 and the pressure balance valve 210 and adapted to permit only the flow of the hydraulic fluid directed to the traveling motor 2. The operation of the flow control valves 206, 209 is controlled by pilot pressure produced by pilot valves respectively operated by control levers (not shown).

In addition, the discharge rate of the hydraulic pump 1 is controlled by the pump regulator 11 in such a manner that the discharge pressure of the hydraulic pump 1 becomes higher by a fixed value than the maximum load pressure of the plurality of actuators including the left and right traveling motors 2, 3.

The flow control valves 206, 209 have load ports 212, 213 respectively communicated with the main lines 201, 202 and 204, 205 in the left and right switched positions illustrated in the drawing for detecting the load pressure of the left and right traveling motors 2, 3. The load ports 212, 213 are respectively connected to load lines 214, 215. The load lines 214, 215 are further connected to a shuttle valve 216 which functions as a higher pressure selecting valve, the shuttle valve 216 being connected to the common load line 56 via a load line 217. Similar load lines of the main circuits of other actuators (not shown) are connected to the common load line 56. By virtue of the above-described arrangement, the highest one of load pressures of the plurality of actuators including the left and right traveling motors 2, 3 is introduced into the load lines 56, 217.

The pressure balance valve 207 has two pressure-receiving portions 218, 219 for urging a valve element within the pressure balance valve 207 in the valve opening direction, and two pressure-receiving portions 220, 221 for urging the same in the valve closing direction. The discharge pressure of the hydraulic pump 1 is introduced from a hydraulic line 223 into the pressure-receiving portion 218. The load pressure of the meter-in circuit of the left traveling motor 2, i.e., the outlet pressure of the flow control valve 206, is introduced into the pressure-receiving portion 219 via a hydraulic line 224. The maximum load pressure is introduced into the pressure-receiving portion 220 via a hydraulic line 225. The inlet pressure of the flow control valve 206 in the meter-in circuit is introduced into the pressure-receiving portion 221 via a hydraulic lie 226. All the pressure-receiving areas of the pressure-receiving portions 218-221 are set to be identical.

The pressure balance valve 210 is also arranged in a similar manner. In other words, the pressure balance valve 210 has two pressure-receiving portions 227, 228 for urging the valve in the valve opening direction and two pressure-receiving portions 229, 230 for urging the valve in the valve closing direction. The discharge pressure of the hydraulic pump 1 is introduced into the pressure-receiving portion 227 via a hydraulic line 232. The load pressure of the meter-in circuit of the right traveling motor 3, i.e., the outlet pressure of the flow control valve 209 in the meter-in circuit, is introduced into the pressure-receiving portion 228 via a hydraulic line 233. The maximum load pressure is introduced into the pressure-receiving portion 229 via a hydraulic line 234. The inlet pressure of the flow control valve 209 in the meter-in circuit is introduced into the pressure-receiving portion 230 via a hydraulic line 235.

The pressure balance valves 207, 210 are further provided with springs 22, 231 for urging valve elements disposed within the pressure balance valves in the valve closing direction. In the same way as the springs 62, 63 and 66, 67 of the first embodiment, these springs 222, 231 function as valve control means as follows: During the driving of the left and right traveling motors 2, 3, i.e., while traveling, these springs 222, 231 do not actuate the pressure balance valves 207, 210 until the differential pressure between the load pressure of the left traveling motor 2 and the load pressure of the right traveling motor 3 reaches a predetermined value $\Delta P_0$ set by the strength of the spring, thereby maintaining the same in the fully open state, and the springs 222, 231 actuate the pressure balance valve associated with the lower load pressure side traveling motor when that differential pressure exceeds the predetermined value $\Delta P_0$, thereby effecting load-compensating control.

By virtue of the above-described arrangement, during the driving of the left and right traveling motors 2, 3, when the opening of the flow control valves 206, 209 is fixed, the pressure balance valve 207 or 210 associated with the lower load pressure side traveling motor 2 or 3 controls the rate of flow through the associated flow control valve 206 or 209, as illustrate in FIG. 2.

In short, in the range in which the differential pressure $\Delta P$ between the load pressures of the left and right traveling motors 2, 3 is less than the predetermined value $\Delta P_0$, the forces acting in the valve opening direction in the pressure balance valves 207, 210 are greater than the forces acting in the valve closing direction, so that neither of the pressure balance valves 207, 210 is actuated, and the pressure balance valves 207, 210 are maintained in the fully open state. At this juncture, if it is assumed that an increase in the differential pressure $\Delta P$ is due to an increase in the maximum load pressure, the discharge rate of the hydraulic pump 1 increases by control of the pump regulator 11. Accordingly, the rates of flow through the flow control valves 206, 209 increase with an increase in the differential pressure $\Delta P$. When the differential pressure between the load pressures of the left and right traveling motors 2, 3 exceeds the predetermined value $\Delta P_0$, with respect to the pressure balance valve 207 or 210 associated with the lower load pressure side traveling motor 2 or 3, the force acting in the valve closing direction becomes greater than that acting in the valve opening direction, thereby moving the valve in the valve closing direction and, hence, restricting the valve opening. For this reason, an increase in the rates of flow through the flow control valves 206, 209 due to the fact that the traveling motor 2 or 3 is on the lower load pressure side is suppressed, and control is thus effected in such a manner that the rate of flow through the flow control valve 206 or 209 becomes fixed. In short, the rates of flow through the flow control valves 206, 209 are subjected to load-compensating control in such a manner as to agree with flow rates corresponding to the valve openings.

As described above, since the pressure balance valves 207, 210 function in the same way as the pressure balance valves of the first embodiment, the hydraulic drive system in accordance with this embodiment also operate in the same way as that of the first embodiment, as described below.

In other words, when the vehicle is made to travel straight, the control levers (not shown) for left and right traveling motors are operated to open the flow control valves 206, 209, for instance, by the same degrees in the switched positions on the right-hand side as viewed in the drawing. As a result, the hydraulic fluid of the same flow rates flows to the flow control valves 206, 209, supplying the hydraulic fluid to the left and right traveling motors 2, 3 at the same flow rates. At this time, when the resistance to which the left and right crawler belts are subjected differs, and there is a differential in the load pressure between the left and right traveling motors 2, 3, the pressure balance valves 207, 210 are not actuated and remain in the fully open state if that differential pressure is less than the aforementioned predetermined value $\Delta P_0$. Hence, the left and right traveling motors are in the same condition as that in which the motors 2, 3 are connected in parallel. For this reason, in the same way as a general hydraulic circuit in which the left and right traveling motors are connected in parallel, the flow rates of the hydraulic fluid supplied to the left and right traveling motors 2, 3 are forcedly made equivalent by the straight traveling-maintaining forces possessed by the crawler belts themselves, thereby effecting the straight traveling. In addition, since the straight traveling is effected forcedly by the straight traveling-maintaining forces of the crawler belts themselves with the pressure balance valves 207, 209 set in the nonoperative state, even if there are any variations in the performance of the hydraulic devices such as the flow control valves 206, 209, the pressure balance valves 207, 210, etc., due to fabrication errors or any slightest changes in the strokes of the control levers, unnecessary compensating control is not effected insofar as the differential pressure between the load pressures is not more than the predetermined value $\Delta P_0$, thereby making it possible to effect the intended straight traveling.

When changing the advancing direction of the vehicle, e.g., when turning to the right, one control lever is operated by a greater degree than the other control lever, so that, for instance, the opening of the flow control valve 206 is set to a greater degree. Consequently, the amount of the hydraulic fluid supplied to the left traveling motor 2 increases, so that the differential pressure between the load pressures of the left and right traveling motors 2, 3 becomes the aforementioned predetermined value $\Delta P_0$ or above, and the pressure balance valve 210 associated with the lower load pressure side right traveling motor 3 is actuated. As a result, the differential pressure across the flow control valve 209 is controlled to a fixed level, so that an increase in the rate of flow therethrough is suppressed, and the hydraulic fluid is supplied to the left and right traveling motors 2, 3 at flow rates corresponding to the openings of the flow control valves 206, 209. Consequently, the vehicle turns to the right, as instructed by the control levers.

As described above, in this embodiment as well, it is possible effect the straight traveling of the vehicle and a change in its advancing direction. At the same time, since straight traveling is effected by the straight traveling-maintaining forces possessed by the crawler belts themselves with the pressure balance valves 207, 210 set in the nonoperative state, even if there are variations in the performance of the hydraulic devices or any changes in the strokes of the control levers, it is readily possible to effect the straight traveling without such variations and changes affecting the straight traveling. Hence, it is possible to substantially alleviate the burden imposed on the operator when effecting straight traveling.

In the above-described third embodiment, the arrangement is such that the pump discharge pressure and the maximum load pressure are directly introduced hydraulically into the pressure balance valves 207, 210. However, an arrangement may be alternatively provided such that, instead of directly introducing the pump discharge pressure and the maximum load pressure hydraulically, a common differential pressure gauge for detecting the differential pressure between the two pressures is provided, and a detected signal of this differential pressure gauge may be imparted electrically to the pressure balance valves or after being converted into a hydraulic signal.

As described above, although three embodiments of the present invention have been given, the present invention is not restricted to these embodiments, and various modifications are possible without departing from the spirit of the present invention. For instance, in the foregoing embodiments, springs are used as valve controlling means which do not cause the associated pressure balance valves to be actuated until the differential pressure between the load pressures of the left and right traveling motors reaches a predetermined value, and causes the pressure balance valve to be actuated when that differential pressure exceeds the predetermined value. However, an arrangement may be alternatively provided such that a fixed level of hydraulic force is imparted instead of using the springs.

What is claimed is:

1. A hydraulic drive system for a crawler-mounted construction vehicle comprising:

a hydraulic pump (1);

a plurality of hydraulic actuators including first and second traveling hydraulic motors (2, 3) driven by a hydraulic fluid discharged by said hydraulic pump;

a plurality of flow control valve means including first and second flow control valve means (15, 16; 35, 36) for respectively controlling the flow rates of said hydraulic fluid supplied from said hydraulic pump to said first and second traveling hydraulic motors;

pump controlling means (11) for effecting control during the driving of said first and second traveling motors in such a manner that the discharge pressure of said hydraulic pump becomes higher by a fixed value than the higher one of load pressures of said traveling motors; and first and second pressure balance valve means (17, 18; 37, 38) for respectively controlling the rates of flow through said flow control valve means during the driving of said first and second traveling motors in such a manner that the load pressures of said traveling motors do not affect the rates of flow through said first and second flow control valve means, wherein said first and second pressure balance valve means (17, 18; 37, 38) are respectively provided with valve control means (62, 63; 66, 67) which do not cause the associated pressure balance valve means to be actuated until the differential pressure between the load pressure generated in said first traveling motor (2) and the load pressure generated in said second traveling motor (3) reaches a predetermined value ($\Delta P_0$), and causes said pressure balance valve means to be actuated when said differential pressure exceeds said predetermined value.

2. A hydraulic drive system for a crawler-mounted construction vehicle according to claim 1, wherein said valve controlling means comprise springs (62, 63; 66, 67) for urging said associated pressure balance valve means (17, 18; 37, 38) in the opening direction.

3. A hydraulic drive system for a crawler-mounted construction vehicle according to claim 1, wherein said first and second pressure balance valve means comprise pressure balance valves (17, 18; 37, 38) disposed downstream of the associated flow control valve means (15, 16; 35, 36), said pressure balance valves having the pressure downstream of said flow control valve means acting in the valve opening direction, and the higher one of load pressures of said first and second traveling motors (2, 3) acting in the valve closing direction, and wherein said valve control means comprise springs (62, 63; 66, 67) for urging the associated pressure balance valves (17, 18; 37, 38) in the valve opening direction.

4. A hydraulic drive system for a crawler-mounted construction vehicle according to claim 1, wherein said first and second flow control valve means (100, 101) include seat valve assemblies (102, 103; 102A, 103A) each having a seat-type main valve (112, 113; 112A 113A), a pilot circuit (116, 117; 116A, 117A) for said main valve, and a pilot valve (120, 121; 120A, 121A) disposed in said pilot circuit and adapted to control the operation of said main valve, wherein said first and second pressure balance valve means respectively comprise pressure balance valves (124, 125; 124A, 125A) each disposed in said pilot circuit of said seat valve assembly of the associated flow control valve means, the pressure balance valves each being actuated in the valve opening direction in response to the pressure differential between the discharge pressure of said hydraulic pump (1) and the higher one of load pressures of said first and second traveling motors (2, 3) and being actuated in the valve closing direction in response to the differential pressure across said pilot valve, and wherein said valve controlling means comprise springs (153, 154; 153A, 154A) for urging the associated pressure balance valves in the valve opening direction.

5. A hydraulic drive system for a crawler-mounted construction vehicle according to claim 1, wherein said first and second pressure balance valve means respectively comprise pressure balance valves (207, 210) disposed upstream of the associated flow control valve means (206, 209), the pressure balance valves each having the differential pressure between the discharge pressure of said hydraulic pump (1) and the higher one of load pressures of said first and second traveling motors (2, 3) acting in the valve opening direction and the differential pressure across the associated flow control valve means acting in the valve closing direction, and wherein said valve controlling means comprise springs (222, 231) for urging the associated pressure balance valves in the valve opening direction.

* * * * *